(12) United States Patent
Strandberg (10) Patent No.: US 11,372,420 B2
(45) Date of Patent: *Jun. 28, 2022

(54) SYSTEM AND METHOD DOCKING ROBOTIC MOWER

(71) Applicant: Globe (Jiangsu) Co., Ltd., Jiangsu (CN)

(72) Inventor: Stefan Strandberg, Joenkoeping (SE)

(73) Assignee: Globe (Jiangsu) Co., Ltd., Jiangsu (CN)

(*) Notice: Subject to any disclaimer, the term of this patent is extended or adjusted under 35 U.S.C. 154(b) by 309 days.

This patent is subject to a terminal disclaimer.

(21) Appl. No.: 16/499,502

(22) PCT Filed: Jun. 12, 2018

(86) PCT No.: PCT/CN2018/090755
§ 371 (c)(1),
(2) Date: Sep. 30, 2019

(87) PCT Pub. No.: WO2019/153616
PCT Pub. Date: Aug. 15, 2019

(65) Prior Publication Data
US 2020/0042008 A1  Feb. 6, 2020

(30) Foreign Application Priority Data
Feb. 7, 2018  (WO) ............... PCT/CN2018/075512

(51) Int. Cl.
*G05D 1/02* (2020.01)
*A01D 34/00* (2006.01)
(Continued)

(52) U.S. Cl.
CPC ......... *G05D 1/0225* (2013.01); *A01D 34/008* (2013.01); *A01D 69/02* (2013.01);
(Continued)

(58) Field of Classification Search
CPC .................................................. G05D 1/0225
See application file for complete search history.

(56) References Cited

U.S. PATENT DOCUMENTS 5,727,372 A   3/1998  Kanitz et al.
8,433,468 B2  4/2013  Johnson et al.
(Continued)

FOREIGN PATENT DOCUMENTS

CN   102662400 A   9/2012
CN   102771246 A   11/2012
(Continued)

OTHER PUBLICATIONS

European Search Report and Search Opinion in related European Patent Application No. 18905406.7 dated Apr. 30, 2021; 11 pages.
(Continued)

*Primary Examiner* — Michael A Berns
(74) *Attorney, Agent, or Firm* — Rooney IP, LLC (57) ABSTRACT

A method and a system for docking a robotic mower with a charging station, the system including a boundary wire and a charging station loop wherein the boundary wire makes a loop in the charging station that is narrower than and crosses the charging station loop. A return signal is received from a control unit commanding the robotic mower to return to the charging station. In response thereto, the robotic mower is controlled to follow the boundary wire until the charging station loop is detected. The robotic mower then follows the charging station loop until a crossing between the charging station loop and the boundary wire loop is detected. Thereafter, the robotic mower is controlled to follow the charging station loop a first distance, and then continuing to drive the robotic mower in a direction straight forward for a second distance. When the robotic mower has moved the second distance it is turned a predefined angle towards the charging (Continued)

station and controlled to follow the boundary wire loop until a charging position is reached.

22 Claims, 7 Drawing Sheets

(51) Int. Cl.
*A01D 69/02* (2006.01)
*G05D 1/00* (2006.01)
*A01D 101/00* (2006.01)

(52) U.S. Cl.
CPC ......... *G05D 1/0088* (2013.01); *G05D 1/0265* (2013.01); *A01D 2101/00* (2013.01); *G05D 2201/0208* (2013.01)

(56) References Cited

U.S. PATENT DOCUMENTS

| | | | |
|---|---|---|---|
| 8,930,024 B2* | 1/2015 | Abramson | B60L 53/65 700/258 |
| 8,942,862 B2 | 1/2015 | Markusson et al. | |
| 9,713,303 B2* | 7/2017 | Jagenstedt | B60L 15/20 |
| 9,876,370 B2* | 1/2018 | Yamamura | H02J 7/0027 |
| 2011/0234153 A1 | 9/2011 | Abramson | |
| 2020/0042008 A1* | 2/2020 | Strandberg | A01D 34/008 |
| 2020/0142425 A1* | 5/2020 | Strandberg | G05D 1/0088 |
| 2020/0401146 A1* | 12/2020 | Strandberg | G05D 1/0214 |

FOREIGN PATENT DOCUMENTS

| | | |
|---|---|---|
| CN | 204860070 U | 12/2015 |
| CN | 106416587 A | 2/2017 |
| EP | 2717110 A1 | 4/2014 |
| EP | 3073602 A1 | 9/2016 |
| JP | 2016010382 A | 1/2016 |

OTHER PUBLICATIONS

Search Report and Written Opinion in related International Patent Application No. PCT/US2018/090755 dated Oct. 31, 2018; 10 pages.

* cited by examiner

SYSTEM AND METHOD DOCKING ROBOTIC MOWER

TECHNICAL FIELD

The present invention relates generally to a system and method for returning a robotic mower back to a charging station when a battery of the robotic mower needs to be recharged, and more specifically for docking the robotic mower with a charging station.

BACKGROUND ART

Robotic mowers, also called self-propelled lawnmowers, are generally known. These robotic mowers are provided with a rechargeable battery. When the remaining power in the battery is below a certain level the robotic mower is programmed to return to the charging station to recharge the battery. In prior art, there are many different methods for returning the robotic mower to the charging station. One common method is that the robotic mower, when receiving a command to return to the charging station, continues its movement until a boundary wire is detected and then follows the boundary wire to the charging station that is provided somewhere along the boundary wire. When the robotic mower is close to the charging station a docking process is started such that the robotic mower is safely guided into contact with a charging connector of the charging station.

U.S. Pat. No. 8,433,468 discloses a robotic mower home finding system, in which a charging station is connected to an outer boundary wire loop. The robotic mower comprises a plurality of sensors for correlating the distance of each sensor to the outer boundary loop. When the robotic mower is commanded to return to the charging station it continues its movement until the plurality of sensors find the outer boundary wire loop and then follows the outer boundary wire loop along a path that is offset a specified distance parallel to the outer boundary wire loop. When an inner wire loop, connected to the charging station, is detected by the plurality of sensors the robotic mower is turned perpendicular to the outer boundary wire loop in order to enter the charging station. The specified distance is changed each time the robotic mower returns home to the charging station. By varying the specific distance, damage to the turf along the boundary wire is avoided, since the robotic mower follows different paths back to the charging station.

U.S. Pat. No. 8,942,862 discloses a method for guiding a robotic garden tool to a predetermined position, i.e. to a charging station. The robotic garden tool comprises a control unit and a sensor unit for wirelessly detecting guiding signals. The guiding signals are generated in guide wires which the robotic garden tool follows when it returns back to the charging station. Using guide wires often enables a shorter and faster way back to the charging station compared to following a boundary wire. When a first guiding signal is detected from a first guide wire, the robotic garden tool follows the first guiding signal at a variable distance from the first guide wire towards the charging station in response to a command from the control unit. When a second guiding signal is detected from a second guide wire the robotic garden follows one of the first or the second guiding signal at a pre-configured distance from the corresponding guide wire towards the charging station. The second guiding signal is detected within a predetermined distance from the charging station.

Thus, there are described numerus different ways in prior art to return a robotic mower to a charging station. However, there is still room for improvements and especially for the final stage, i.e. the docking to the charging station. The problem with the docking process is to make an accurate line up of the robotic mower that ensures that the charging contacts of the robotic mower will securely attach to the docking station.

SUMMARY OF INVENTION

An object of the present invention is to provide a method for returning a robotic mower to a charging station when the robotic mower needs to be recharged and where the docking process, i.e. the process when the robotic mower is about to dock with charging contacts in the charging station, is simple and reliable.

According to one aspect of the present invention this object is achieved by a method for docking a robotic mower with a charging station, which method is performed by a system comprising the robotic mower having a control unit and at least one sensor, a boundary wire, a charging station loop and the charging station and wherein the boundary wire makes a loop in the charging station that is narrower than and crosses the charging station loop. The method comprises receiving a return signal from the control unit that the robotic mower shall return to the charging station. In response thereto, the robotic mower is controlled to follow the boundary wire at a distance until the charging station loop is detected by means of the at least one sensor. The robotic mower is then controlled to follow the charging station loop in a direction away from the boundary wire, by using at least one sensor, until a crossing between the charging station loop and the boundary wire loop is detected, by means of the at least one sensor. Thereafter, the robotic mower is controlled to follow the charging station loop a first distance after detection of the crossing, and then continuing to drive the robotic mower in a direction straight forward for a second distance. When the robotic mower has moved the second distance it is turned towards the charging station, by means of the control unit, and then the robotic mower is controlled to follow the boundary wire loop with at least one sensor until a charging position is reached.

In an advantageous embodiment, the step of turning comprises turning the robotic mower a first predetermined angle towards the charging station, controlling the robotic mower to drive backwards a third distance, and turning the robotic mower a second predetermined angle towards the charging station. Preferably, the step of turning is repeated until the robotic mower is aligned with the boundary wire loop.

In an exemplary embodiment, the robotic mower is controlled to follow the boundary wire at a random distance.

In another exemplary embodiment, the robotic mower reaches the first distance and second distance when at least one sensor is in a known position in front of the charging station. The first and second distance are predetermined distances.

In an exemplary embodiment, the robotic mower turns towards the charging station until at least one sensor passes the boundary wire loop.

In another exemplary embodiment the robotic mower is provided with three sensors, two front sensors and one rear sensor and the detection of the charging station loop is determined when one of the two front sensors passes the charging station loop.

In yet another exemplary embodiment the robotic mower is provided with four sensors, two front sensors and two rear sensors and the first distance and the second distance are reached when one of the two rear sensors reaches the charging station loop and the boundary wire loop, respectively.

In an additional exemplary embodiment, the front sensor furthest away from the boundary wire is used to follow the charging station loop.

Another object of the present invention is to provide a system for docking a robotic mower with a charging station when the robotic mower needs to be recharged and where the docking process, i.e. the process when the robotic mower is about to dock with charging contacts in the charging station, is simple and reliable.

According to another aspect of the present invention this object is achieved by a system for docking a robotic mower with a charging station, comprising the robotic mower, a boundary wire, a charging station loop and the charging station and wherein the boundary wire makes a loop in the charging station that is narrower than and crosses the charging station loop, the robotic mower further comprises a control unit and at least one sensor, wherein the control unit comprises a processor and a memory, the memory comprising instructions which when executed by the processor causes the system to:

receive a return signal from the control unit that the robotic mower shall return to the charging station, control the robotic mower to follow the boundary wire at a distance, detect the charging station loop by means of the at least one sensor, control the robotic mower to follow the charging station loop, in a direction away from the boundary wire, with at least one sensor, detect, by means of the at least one sensor, a crossing between the charging station loop and the boundary wire loop, control the robotic mower to follow the charging station loop a first distance after detection of the crossing, continue to drive the robotic mower in a direction straight forward for a second distance, turn, by means of the control unit, the robotic mower towards the charging station, and control the robotic mower to follow the boundary wire loop with at least one sensor until a charging position is reached.

In an advantageous embodiment, the system is configured to turn the robotic mower a first predetermined angle towards the charging station, control the robotic mower to drive backwards a third distance, and turn the robotic mower a second predetermined angle towards the charging station. Preferably, the system is configured to repeat the step of turning until the robotic mower is aligned with the boundary wire loop.

In an exemplary embodiment, the robotic mower of the system is further caused to follow the boundary wire at a random distance.

In another exemplary embodiment, the robotic mower of the system is further caused to determine that the first distance and second distance are reached when at least one sensor is in a known position in front of the charging station. The first and second distance are predetermined distances.

In an exemplary embodiment, the robotic mower of the system is caused to turn towards the charging station until at least one sensor passes the boundary wire loop In another exemplary embodiment, the robotic mower is provided with three sensors, two front sensors and one rear sensor and the system is further caused to determine detection of the charging station loop is determined when one of the two front sensors passes the charging station loop.

In yet another exemplary embodiment, the robotic mower is provided with four sensors, two front sensors and two rear sensors and wherein the first distance and the second distance are reached when one of the two rear sensors reaches the charging station loop and the boundary wire loop, respectively.

In yet another exemplary embodiment, the system is further caused to use both front sensors to control the robotic mower, such that the robotic mower follows the boundary wire loop to the charging position.

Another object of the present invention is to provide a method, that is simple and reliable, for docking a robotic mower with a charging station when the robotic mower needs to be recharged and the robotic mower uses a guide wire when returning back to the charging station.

According to yet another aspect of the present invention this object is achieved by a method performed by a system for docking a robotic mower with a charging station, wherein the system comprises the robotic mower having a control unit and at least one sensor, a boundary wire, a charging station loop, the charging station and at least one guide wire. The boundary wire makes a loop in the charging station that is narrower than and crosses the charging station loop. The method comprises receiving a return signal from the control unit that the robotic mower shall return to the charging station. In response thereto, the robotic mower is controlled to follow the guide wire at a random distance until the robotic mower detects the charging station loop by means of the at least one sensor. When the charging station loop is detected, the robotic mower is controlled to move closer to the guide wire until it is detected, by means of the at least one sensor, that the robotic mower passes the boundary wire loop. The robotic mower is the controlled to follow the boundary wire loop with at least one sensor until a charging position is reached.

In an exemplary embodiment, the robotic mower is provided with three sensors, two front sensors and one rear sensor and the detection of the boundary wire loop is determined when one of the front sensors passes the charging station loop. In another exemplary embodiment, both front sensors are then used to control the robotic mower during the docking process, such that the robotic mower follows the boundary wire loop to the charging position.

Another object of the present invention is to provide a system that is simple and reliable and used for docking a robotic mower with a charging station when the robotic mower needs to be recharged and the robotic mower uses a guide wire when returning back to the charging station.

According to another aspect of the present invention this object is achieved by a system for docking a robotic mower with a charging station, the system comprises the robotic mower, a boundary wire, at least one guide wire, a charging station loop and the charging station. The boundary wire makes a loop in the charging station that is narrower than and crosses the charging station loop. The robotic mower comprises a control unit and at least one sensor, wherein the control unit comprises a processor and a memory, the memory comprising instructions which when executed by the processer causes the system to:

receive a return signal from the control unit that the robotic mower shall return to the charging station, control the robotic mower to follow the guide wire at a random distance, detect the charging station loop by means of the at least one sensor, control the robotic mower to move closer to the guide wire, detect, by means of the at least one sensor, that the robotic mower passes the boundary wire loop, and control the robotic mower to follow the boundary wire loop with at least one sensor until a charging position is reached.

In an exemplary embodiment, the robotic mower is provided with three sensors, two front sensors and one rear sensor and the system is further caused to determine detection of the charging station loop when one of the front sensors passes the charging station loop. In another exemplary embodiment, the system is further caused to use both front sensors to control the robotic mower during the docking process, such that the robotic mower follows the boundary wire loop to the charging position.

According to one aspect there is achieved a computer program comprising computer program code, which computer program code is adapted, if executed by the processer of the control unit, to implement the methods described above.

By providing a method and a system for docking a robotic mower with a charging station according to the present invention it is possible to achieve a reliable yet simple docking process, where the robotic mower is safely guided into contact with the charging contacts of the charging station.

The solution will also reduce the component costs for a charging station compared to having separate loop wires for guiding the mower to a charging position. The reduced number of loop wires will also reduce the number unique codes that are needed and used by the system which further reduces the complexity.

BRIEF DESCRIPTION OF DRAWINGS

The invention is now described, by way of example, with reference to the accompanying drawings, in which:

FIG. 5a to FIG. 5m show different docking steps when the robotic mower docks with a charging station via a boundary wire.

FIG. 6a to FIG. 6d show different docking steps when the robotic mower docks with a charging station via a guide wire.

DESCRIPTION OF EMBODIMENTS

In the following, a detailed description of exemplary embodiments for docking a robotic mower with a charging station according to the present invention will be presented.

Figure 1:
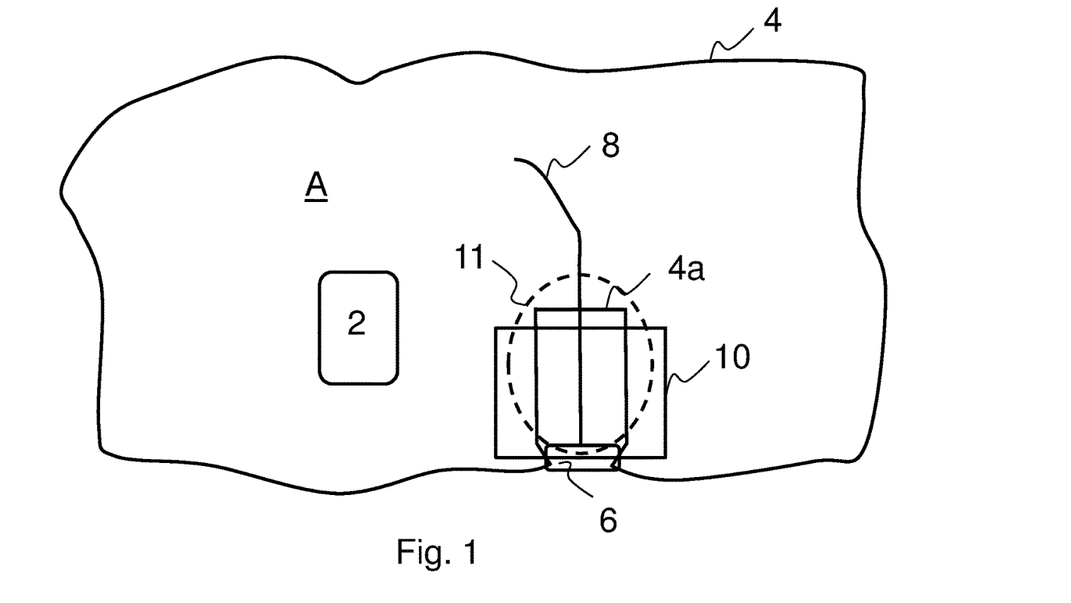
FIG. 1 a schematic view of a robotic mower system.

FIG. 1 shows a schematic overview of a system for performing the method of docking a robotic mower 2 with a charging station 11. The robotic mower 2, or as it also may be called a self-propelling lawnmower, is battery powered and needs to be recharged at regular intervals. The robotic mower 2 is during operation configured to move across an area A surrounded by a boundary wire 4. As is obvious the robotic mower 2 is depicted somewhat enlarged for the sake of clarity. The boundary wire 4 may be configured in many different ways, such that it delimits the area A within which the robotic mower 2 is allowed to move. The boundary wire 4 is preferably provided under the ground in the lawn, such that is not visible, but may also be provide on or above the ground. The boundary wire 4 could be an ordinary copper wire of single-core type. There are of course also other options, which are well-known by a person skilled in the art, such as multi stranded wire types. As may be seen in FIG. 1 the boundary wire 4 makes a loop 4a in the charging station 11. This loop 4a will be used to guide the robotic mower 2 into charging contact with the charging station 11, which will be described further below.

The system also comprises the charging station 11 mentioned above. The charging station 11 is shown with dotted lines in FIG. 1 in order to not unnecessary smudge the figure. The charging station itself 11 may be seen as the place where the charging of the robotic mower 2 takes place, but could for an example also be provided with a charging plate onto which the robotic mower 2 is guided when performing docking. A charging plate will make the docking process more precise, since the robotic mower 2 will be at an even and predictable ground during the docking process. In order to identify where the charging station 11 is located, there is provided a charging station loop 10 around the charging station 11. As shown in FIG. 1 the boundary wire loop 4a is narrower than and crosses the charging station loop 10.

A system according to the present invention may also as an option comprise one or more guide wires 8. A guide wire 8 is a wire that the robotic mower 2 may follow when returning to the charging station 11. Normally the robotic mower follows the boundary wire 4 back to the charging station 11, which depending on where the robotic mower 2 starts to follow the boundary wire 4 may be quite a distance. By using a guide wire 8 it is possible to return the robotic mower 2 to the charging station 11 in a faster and less energy consuming way, which is well known in the art.

The boundary wire 4, the charging station loop 10 and the optional one or more guide wires 8 are all connected to a signal generator 6 which feeds each wire and loop with an Alternating Current, AC, signal, such that the robotic mower 2 may recognize which wire or loop it is detecting when it is within sensing distance, which is also known in the art.

Figure 2A:
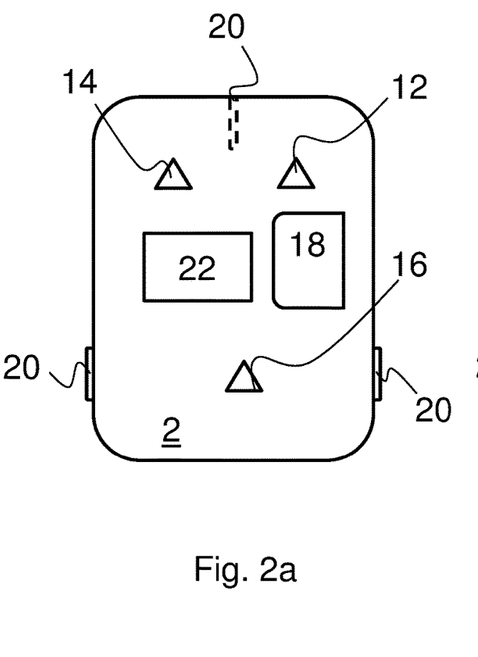
FIG. 2a is a schematic view of an exemplary embodiment of the robotic mower.

Turning now to FIG. 2a, an exemplary embodiment of the robotic mower 2 will be closer described. The robotic mower 2 comprises a control unit 22, wheels 20, at least one sensor 12, 14 and/or 16 and a battery 18. The control unit 22, which will be closer described in conjunction with FIG. 3, comprises among other things a processor 80 for controlling the movement of the robotic mower 2. When the robotic mower 2 is in operation the sensors 12, 14 and 16 sense the magnetic field that is generated in the boundary wire 4, the charging station loop 10 and where appropriate also the one or several guide wires 8. The sensed magnetic field (signal) is decoded in the control unit 22 to determine from which loop or wire it was received. In a preferred embodiment, the robotic mower 2 is provided with three sensors, two front sensors 12, 14 and one rear sensor 16. In this embodiment one of the two front sensors 12, 14 may be used to detect the presence of the charging station loop 10. This configuration may be beneficial for increasing the precision in the docking process.

Figure 2B:
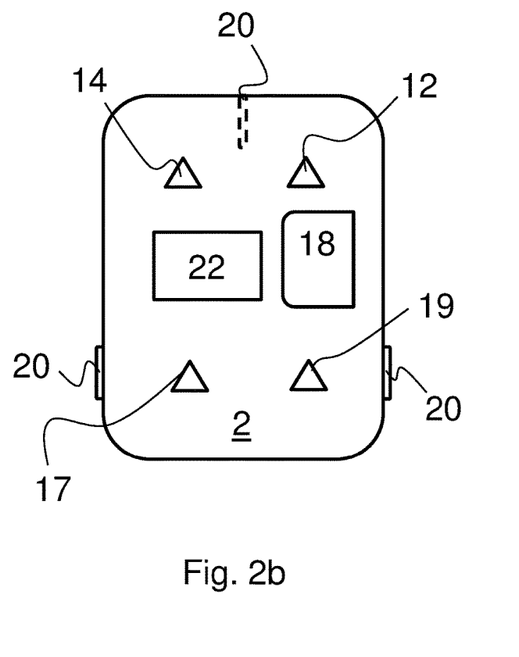
FIG. 2b is a schematic view of another exemplary embodiment of the robotic mower.

FIG. 2b shows another embodiment of the robotic mower 2, the difference to the previous embodiment being that it comprises two rear sensors 17, 19 instead of one. The rest of the description of the robotic mower 2 will therefore not be repeated here. With two rear sensors 17, 19 the precision of the docking process may be further enhanced. One or both of the rear sensors 17, 19 may for example be used when determining that a first distance and second distance has been reached in relation to the charging station loop 10 and the boundary wire loop 4a, respectively, during the docking process as will be further be described below.

Figure 3:
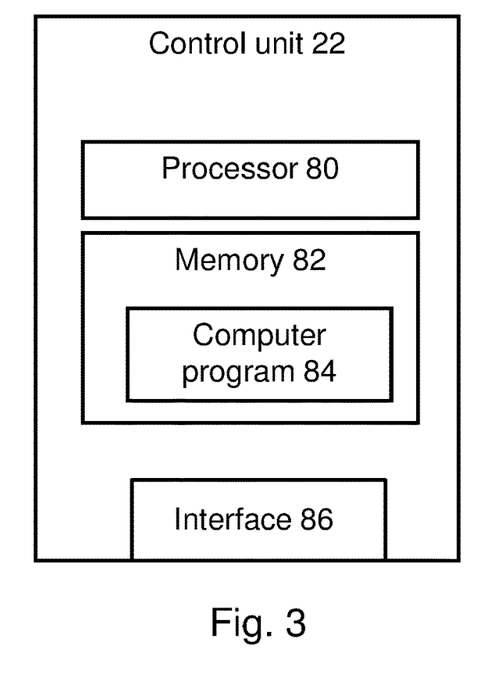
FIG. 3 is a schematic block diagram of a control unit in the robotic mower.

With reference to FIG. 3, the control unit 22 of the robotic mower 2 will be closer described. The control unit 22 comprises, as mentioned above the processor 80 and a memory 82. The memory 82 may comprise a computer program 84 comprising computer program code, i.e. instructions. The computer program code is adapted to implement the method steps performed by the robotic mower 2 when the code is executed on the processor 80. The control unit 22 further comprises an interface 86 for communication with the sensors 12, 14 and 16, and the sensors 12, 14, 17 and 19, respectively, and a motor that operates the robotic mower 2.

The processor 80 may comprise a single Central Processing Unit (CPU), or could comprise two or more processing units. For example, the processor 80 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 80 may also comprise a storage for caching purposes.

Figure 4:
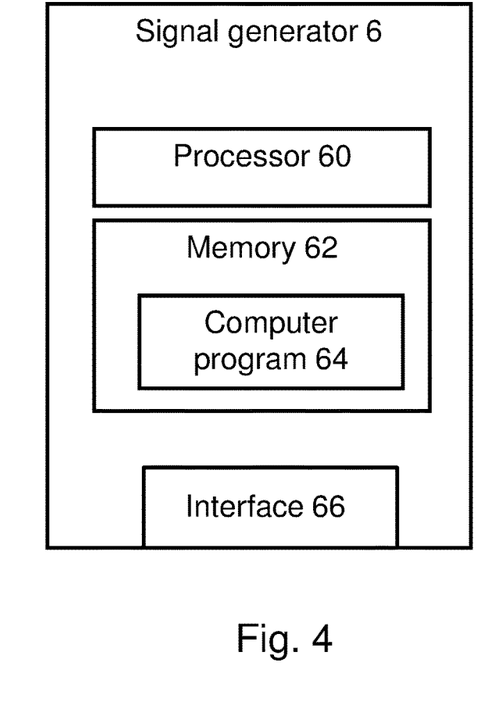
FIG. 4 is a schematic block diagram of a signal generator.

FIG. 4 depicts the signal generator 6, which also comprises a processor 60 and a memory 62. The memory 62 may comprise a computer program 64 comprising computer program code, i.e. instructions. The computer program code is adapted to implement the method steps performed by the signal generator 6 when the code is executed on the processor 60. The signal generator 6 further comprises an interface 66 for transmitting the generated AC signal to the boundary wire 4, charging station loop 10 and if appropriate the guide wire or wires 8.

As for processor 80 also the processor 60 may comprise a single Central Processing Unit (CPU), or could comprise two or more processing units. For example, the processor 60 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 60 may also comprise a storage for caching purposes.

Turning now to FIG. 5a to FIG. 5k and FIG. 7 exemplary embodiments of the method according the present invention will be closer described. The method starts in step S100 in which the robotic mower 2 receives a return signal from the control unit 22, which commands the robotic mower 2 to return to the charging station 11. Step S100 may be triggered by detecting that the power in the battery 18 is lower than a predetermined limit. The predetermined limit is set such that the robotic mower 2 may safely return to the charging station 11 before the battery 18 is empty, even if it happens to be the longest possible way back to the charging station 11.

Figure 5A:
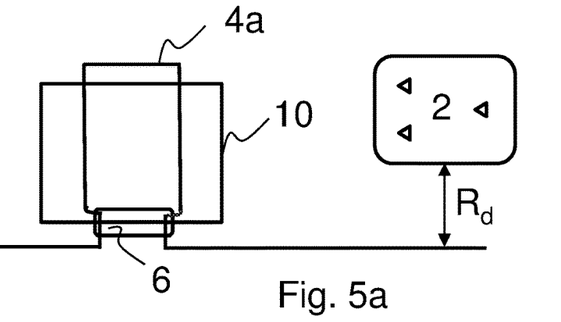
Figure 5B:
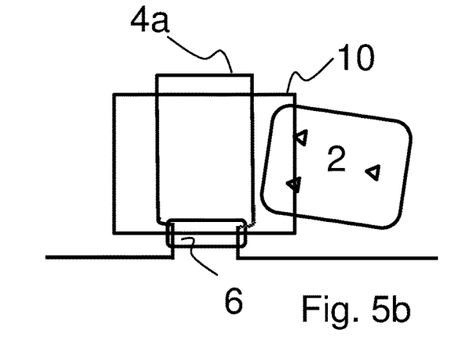
Figure 5C:
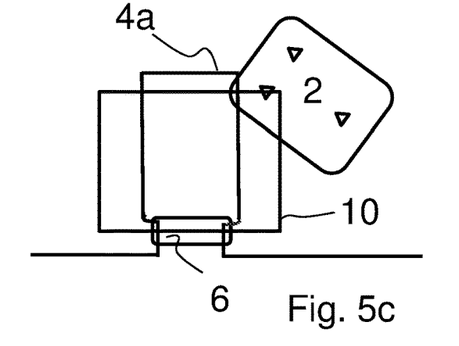
Figure 5D:
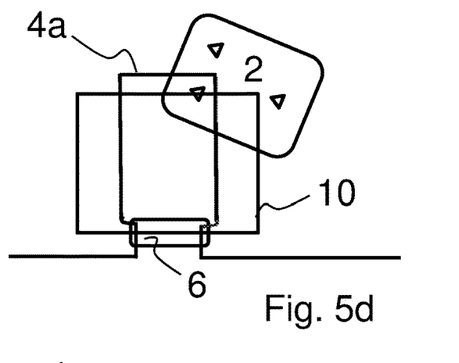
Figure 5E:
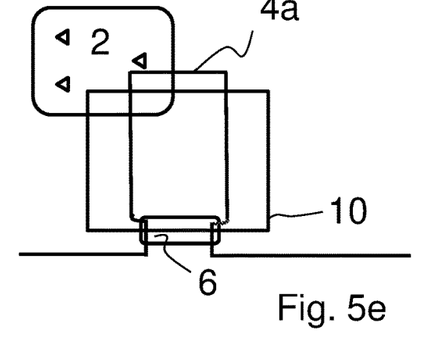
Figure 5F:
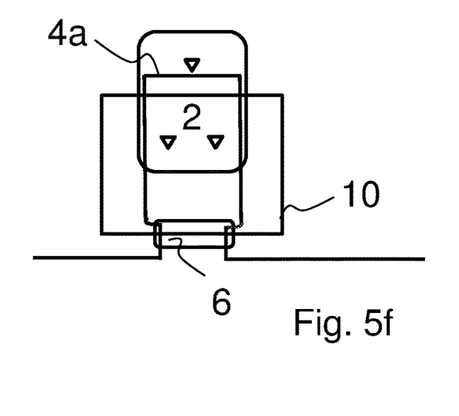
Figure 5G:
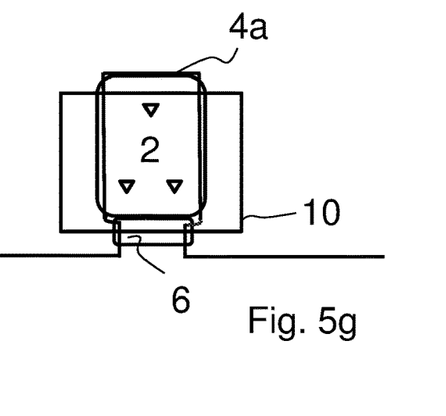
Figure 7:
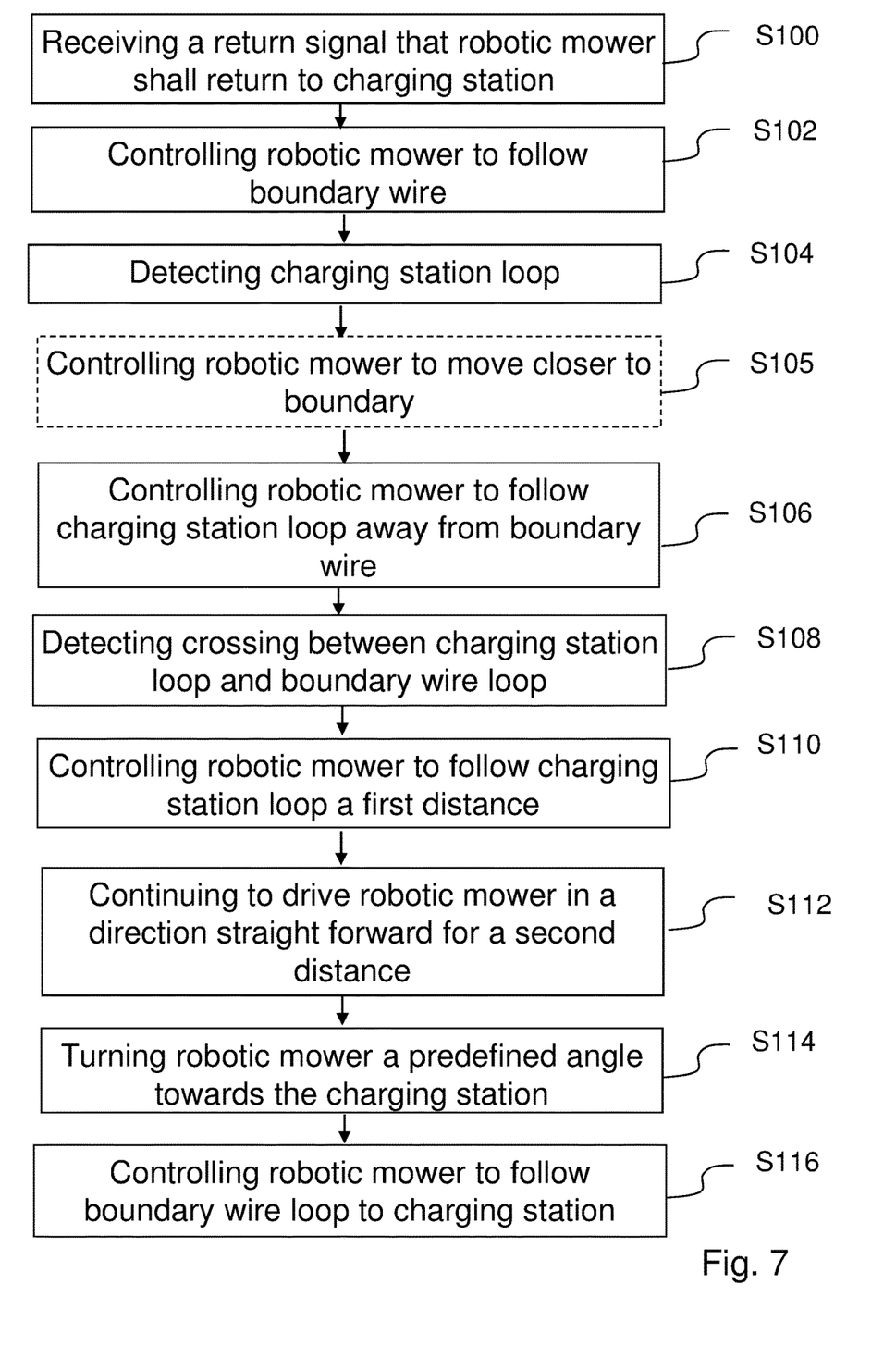
FIG. 7 is a flow chart of an exemplary method for docking the robotic mower with the charging station.

When the robotic mower 2 has received the command to return to the charging station 11, it commences with mowing the area A until it detects the boundary wire 4 by means of one or more of the robotic mower's 2 sensors 12, 14 and 16 or 12, 14, 17 and 19, respectively. When the boundary wire 4 has been detected, the robotic mower 2 is controlled, in step S102, to follow the boundary wire 4 at a fixed or random distance $R_d$. The randomness may be determined by a random generator in the control unit 22 each time that the command to return the robotic mower 2 to the charging station 11 is generated. Thus, the control unit 22 determines that it is time to return to the charging station 11, generates a random distance and sends a command to the robotic mower 2 to return and which distance to the boundary wire 4 to use when returning. By using different distances when the robotic mower 2 is to return to the charging station 11 tracking in the lawn may be avoided.

The robotic mower 2 will follow the boundary wire 4 at the random distance $R_d$ until detecting, in step S104, the charging station loop 10 by means of at least one of the sensors 12, 14, 16, 17 or 19. In one embodiment the detection of the charging station loop 10 is determined when one of the front sensors 12, 14 passes the charging station loop 10. As a response thereto, the robotic mower 2 is controlled, in step S106, by the control unit 22 to follow the charging station loop 10, in a direction away from the boundary wire 4, by using at least one sensor 12, 14, 16, 17, 19. In one exemplary embodiment the robotic mower 2 is controlled, in step S105 to move in a direction closer to the boundary wire 4 after detecting the charging station loop 10, such that the docking process may be better controlled. This is however optional, as is indicated by the dotted lines in FIG. 7.

The robotic mower 2 will follow the charging station loop 10, including making a 90 degree turn as the charging station loop 10 turns 90 degrees, until a crossing between the charging station loop 10 and the boundary wire loop 4a is detected, in step S108, by means of the at least one sensor 12, 14, 16. The detection of the crossing triggers the robotic mower 2 to follow the charging station loop 10, in step S110, a first predetermined distance after the detection of the crossing. This first predetermined distance is long enough to straighten up the robotic mower 2 such that it runs parallel with the charging station loop 10. When the robotic mower 2 has moved the first predetermined distance it continues, in step S112, to drive the robotic mower 2 in a direction straight forward for a second predetermined distance. After this step S112 the robotic mower 2 is in a position that generally will be the same and that will ensure that the docking between the robotic mower 2 and the charging contacts in the charging station 11 will run smoothly.

Thus, in this position the robotic mower will 2 be rotated or turned a predefined angle towards the charging station 11, in step S114, by means of the control unit 22. The robotic mower 2 may also be turned until the front sensors 12, 14 pass the boundary wire 4 towards the charging station 11. After the turn, the robotic mower 2 is controlled, in step S116, to follow the boundary wire loop 4a with at least one sensor 12, 14, 16, until a charging position is reached.

Figure 5H:
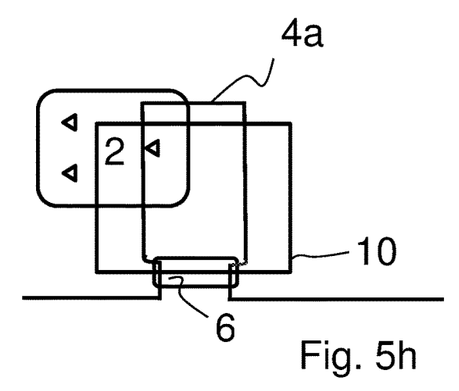

In some cases, the strength of the magnetic field generated by the charging station loop 10 and/or the boundary wire loop 4a is higher adjacent the respective loop wire than directly above the loop wire. This may be caused by the strong magnetic field in and around the charging plate of the charging station 6 due to the limited space for all the cables and wires. In order to ensure that the robotic mower 2 properly follows the charging loop 10, the front sensor 12, 14 located furthest away from the boundary wire 4, and thus, the charging station 11, may be used. However, this may result in that the position of the robotic mower 2 after step S112 is too close to the charging station 11 to turn, as illustrated in FIG. 5*h*.

Figure 5I:
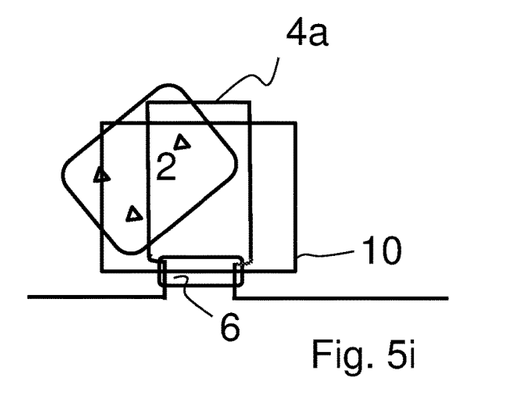
Figure 5J:
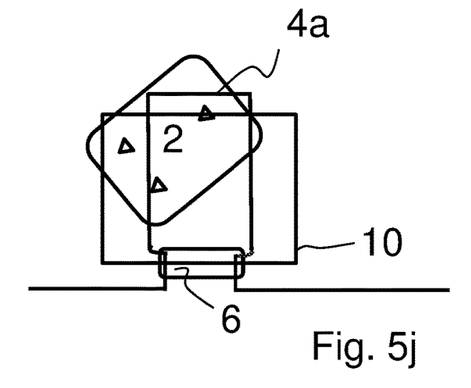
Figure 5K:
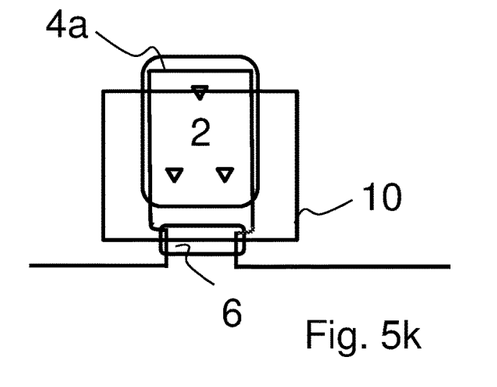

To facilitate smooth docking of the robotic mower 2 with the charging station 11, step S114 may then be performed in a sequence of several steps. First, the robotic mower 2 will be rotated or turned a first predetermined angle towards the charging station 11, as seen in FIG. 5*i*, then the robotic mower 2 is controlled to drive backwards a predetermined distance, i.e. away from the charging station 11, as seen in FIG. 5*j*, and finally, the robotic mower 2 is rotated or turned a second predetermined angle towards the charging station 11, as seen in FIG. 5*k*. This sequence of steps ensures that the robotic mower 2 is optimally aligned with the boundary wire loop 4*a*, and thus, the charging contacts of the charging station 11, before step S116 is carried out. If necessary, the sequence of steps may be repeated until optimal alignment is achieved.

In an exemplary embodiment, the robotic mower 2 is provided with three sensors, two front sensors 12, 14 and one rear sensor 16 and the detection of the charging station loop 10 is then determined when one of the two front sensors 12, 14 passes the charging station loop 10. As is understood by a person skilled in the art there are many ways to use three or four sensors in order to guide the robotic mower 2 during the docking process. For example, both front sensors 12, 14 may be used to control the robotic mower 2, in step S116, to increase the accuracy when the robotic mower 2 follows the boundary wire loop 4*a* to the charging position. Furthermore, the width of the boundary wire loop 4*a*, may be adapted to the actual distance between the two front sensors 12, 14, which will increase the robustness of the docking process.

Figure 5L:
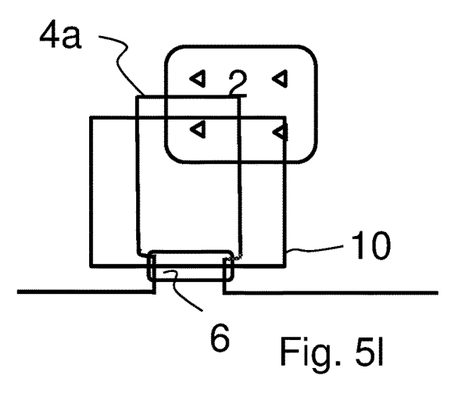
Figure 5M:
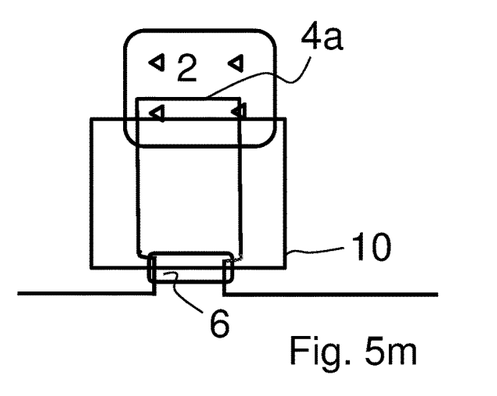
Figure 6A:
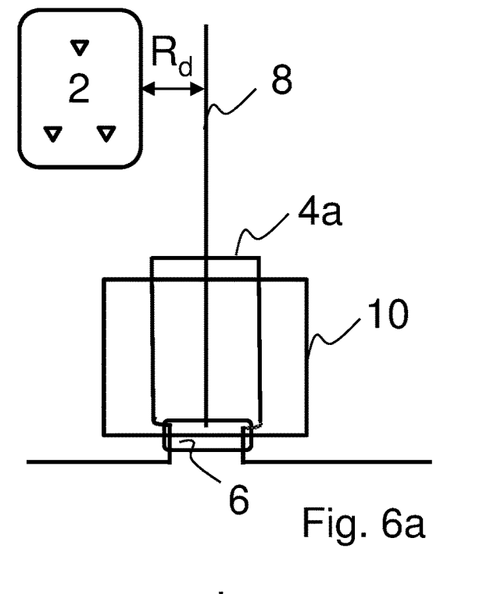
Figure 6B:
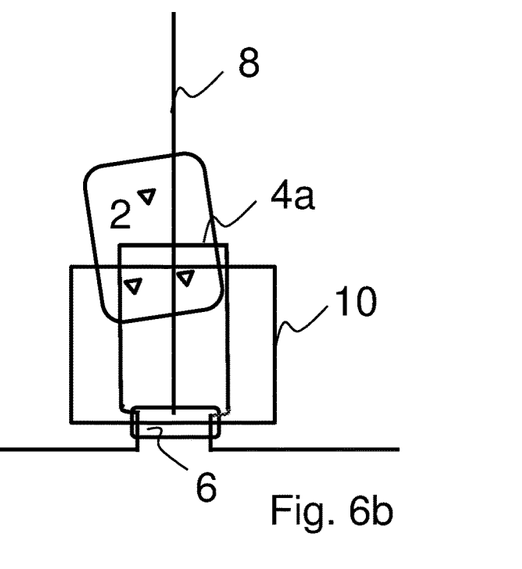
Figure 6C:
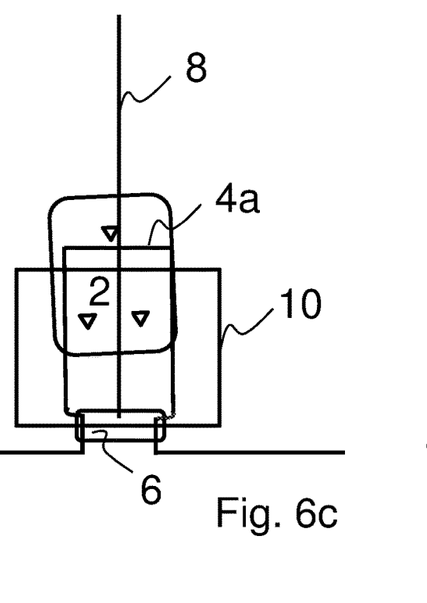
Figure 6D:
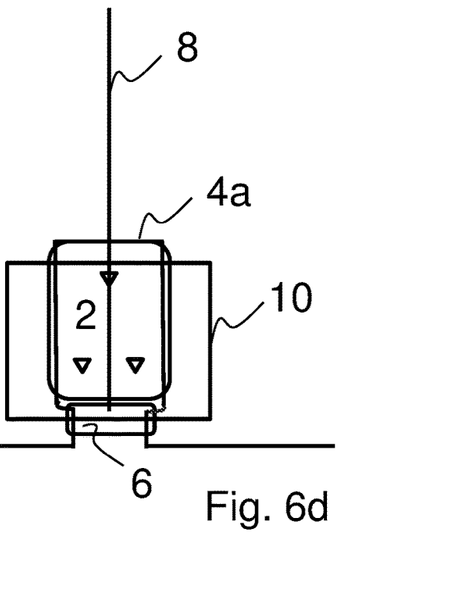

If the robotic mower 2 is provided with four sensors 12, 14, 17, 19 instead steps S110 and S112 may be performed in a different way. In step S110 the first distance is then reached when one of the rear sensors 17, 19 is at a known position in front of the charging station 11, for example when one of the rear sensors 17, 19 reaches the charging station loop 10. In step S112 the second distance is then reached when one of the rear sensors 17, 19 is at a known position in front of the charging station, for example when one of the rear sensors 17, 19 reaches the boundary wire loop 4*a*. These alternative steps are shown in FIGS. 5*l* and 5*m*.

Turning now to FIG. 6*a* to FIG. 6*d* and FIG. 8 another exemplary embodiment of the method according to the present invention will be closer described. The difference between the previous described method and this method is that the later one uses a guide wire 8 to return to charging station 11 instead of boundary wire, which enables a shorter return time for the robotic mower 2 when it returns to the charging station 11. The method starts in step S200 in which the robotic mower 2 receives a return signal from the control unit 22, which commands the robotic mower 2 to return to the charging station 11. As mentioned above the return signal may be triggered by detecting that the power in the battery 18 is lower than a predetermined limit. However, there may also be other trigger events, such as a rain sensor that has detected rain.

Figure 8:
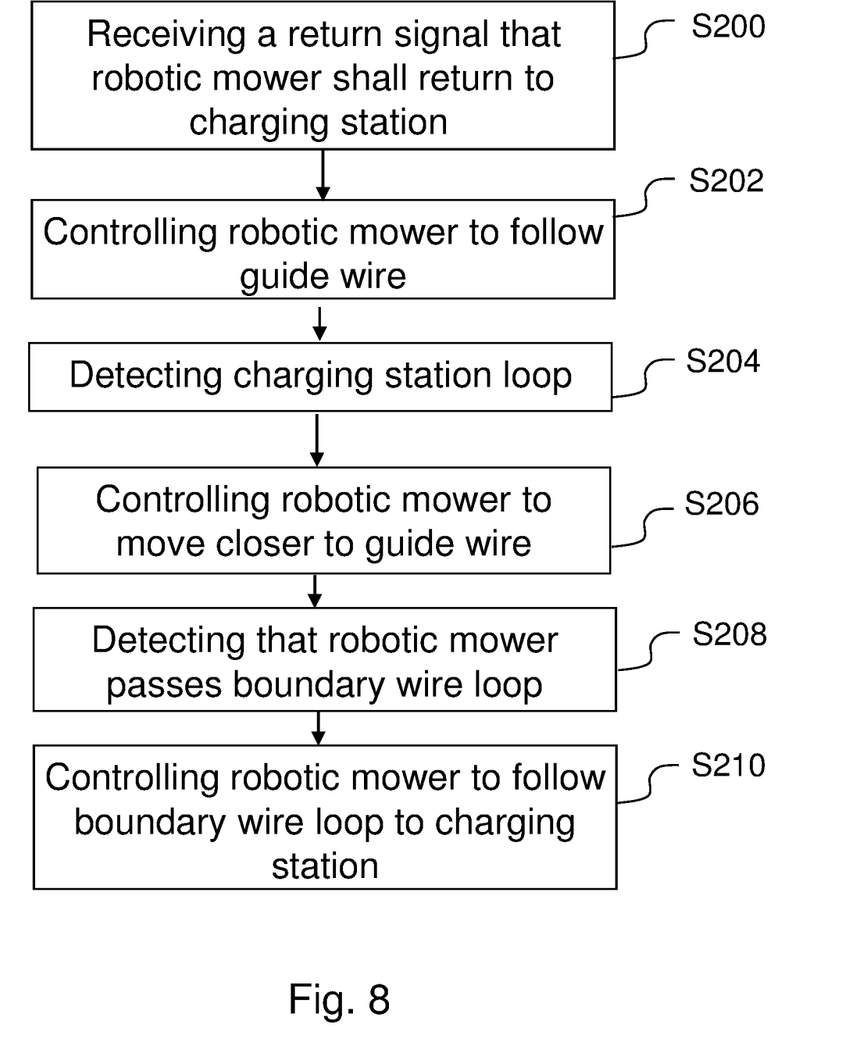
FIG. 8 is a flow chart of another exemplary method for docking the robotic mower with the charging station.

When the robotic mower 2 has received the command to return to the charging station 11, it commences with mowing the area A until it detects the guide wire 8 by means of one or more of the robotic mower's 2 sensors 12, 14 and 16. When the guide wire 8 has been detected, the robotic mower 2 is controlled, in step S202, to follow the guide wire 4 at a random distance Rd. As mentioned above, the randomness may be determined by a random generator in the control unit 22.

The robotic mower 2 will follow the guide wire 8 at the random distance Rd until detecting, in step S204, the charging station loop 10 by means of at least one of the sensors 12, 14, 16. In one embodiment the detection of the charging station loop 10 is determined when one of the front sensors 12, 14 passes the charging station loop 10. As a response thereto, the robotic mower 2 is controlled, in step S206, by the control unit 22, to move closer to the guide wire 8. This is done to ensure that the robotic mower 2 will cross the boundary wire loop 4*a*, when continuing to follow the guide wire 8. Thus, how close to the guide wire 8 the robotic mower 2 has to be moved is decided by the width of the boundary wire loop 4*a*.

The robotic mower 2 continues to follow the guide wire 8 at a closer distance until it is detected by means of the at least one sensor 12, 14, 16, in step S208, that the robotic mower 2 passes the boundary wire loop 4*a*. Thereafter, the robotic mower 2 is controlled, in step 210, to follow the boundary wire loop 4*a* with at least one sensor 12, 14, 16 until a charging position is reached. As mentioned above, there are many ways to use three sensors 12, 14 and 16 in order to guide the robotic mower 2 during the docking process. For example, both front sensors 12, 14 may be used to control the robotic mower 2, in step S210, to increase the accuracy when the robotic mower 2 follows the boundary wire loop 4*a* to the charging position. Furthermore, the width of the boundary wire loop 4*a*, may also in this exemplary embodiment be adapted to the actual distance between the two front sensors 12, 14, which will increase the robustness of the docking.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

The invention claimed is:

1. A method performed by a system for docking a robotic mower with a charging station, the system comprising the robotic mower having a control unit and at least one sensor, a boundary wire, a charging station loop and the charging station, and wherein the boundary wire makes a loop in the charging station that is narrower than and crosses the charging station loop, the method comprising:
   a) receiving a return signal from the control unit that the robotic mower shall return to the charging station,
   b) controlling the robotic mower to follow the boundary wire at a distance,
   c) detecting the charging station loop by means of the at least one sensor,
   d) controlling the robotic mower to follow the charging station loop, in a direction away from the boundary wire, by using the at least one sensor, e) detecting, by means of the at least one sensor, a crossing between the charging station loop and the boundary wire loop,
f) controlling the robotic mower to follow the charging station loop a first distance after detection of the crossing,
g) continuing to drive the robotic mower in a direction straight forward for a second distance,
h) turning, by means of the control unit, the robotic mower towards the charging station by turning the robotic mower a first predetermined angle towards the charging station, controlling the robotic mower to drive backwards a third distance, and turning the robotic mower a second predetermined angle towards the charging station, and repeating this step until the robotic mower is aligned with the boundary wire loop, and
i) controlling the robotic mower to follow the boundary wire loop with the at least one sensor until a charging position is reached.

2. The method according to claim 1, wherein the robotic mower follows the boundary wire at a random distance.

3. The method according to claim 1, wherein the first distance and the second distance are reached when the at least one sensor is in a known position in front of the charging station.

4. The method according to claim 1, wherein the first distance and the second distance are predetermined distances.

5. The method according to claim 1, wherein the robotic mower is turning towards the charging station until the at least one sensor passes the boundary wire loop.

6. The method according to claim 1, wherein the robotic mower is provided with three sensors, the three sensors including two front sensors and one rear sensor and wherein the detection of the charging station loop is determined when one of the front sensors passes the charging station loop.

7. The method according to claim 6, wherein the front sensor furthest away from the boundary wire is used in step d) to follow the charging station loop.

8. The method according to claim 1, wherein the robotic mower is provided with four sensors, the four sensors including two front sensors and two rear sensors and wherein the first distance and the second distance are reached when one of the two rear sensors reaches the charging station loop and the boundary wire loop, respectively.

9. A system for docking a robotic mower with a charging station, comprising the robotic mower, a boundary wire, a charging station loop and the charging station and wherein the boundary wire makes a loop in the charging station that is narrower than and crosses the charging station loop, the robotic mower further comprising a control unit and at least one sensor, wherein the control unit comprises a processor and a memory, the memory comprising instructions which when executed by the processer causes the system to:
a) receive a return signal from the control unit that the robotic mower shall return to the charging station,
b) control the robotic mower to follow the boundary wire at a distance,
c) detect the charging station loop by means of the at least one sensor,
d) control the robotic mower to follow the charging station loop, in a direction away from the boundary wire, with the at least one sensor,
e) detect, by means of the at least one sensor, a crossing between the charging station loop and the boundary wire loop,
f) control the robotic mower to follow the charging station loop a first distance after detection of the crossing,
g) continue to drive the robotic mower in a direction straight forward for a second distance,
h) turn, by means of the control unit, the robotic mower towards the charging station by turning the robotic mower a first predetermined angle towards the charging station, controlling the robotic mower to drive backwards a third distance, and turning the robotic mower a second predetermined angle towards the charging station, and repeating this step until the robotic mower is aligned with the boundary wire loop, and
i) control the robotic mower to follow the boundary wire loop with the at least one sensor until a charging position is reached.

10. The system according to claim 9, which is further caused to follow the boundary wire at a random distance.

11. The system according to claim 9, which is further caused to determine that the first distance and the second distance are reached when the at least one sensor is in a known position in front of the charging station.

12. The system according to claim 9, which is further caused to determine that the first distance and the second distance are predetermined distances.

13. The system according to claim 9, which is further caused to turn the robotic mower towards the charging station until the at least one sensor passes the boundary wire loop.

14. The system according to claim 9, wherein the robotic mower is provided with three sensors, the three sensors including two front sensors and one rear sensor and wherein the system is further caused to determine detection of the charging station loop when one of the front sensors passes the charging station loop.

15. The system according to claim 9, wherein the robotic mower is provided with four sensors, the four sensors including two front sensors and two rear sensors and wherein the first distance and the second distance are reached when one of the two rear sensors reaches the charging station loop and the boundary wire loop, respectively.

16. A method performed by a system for docking a robotic mower with a charging station, the system comprising the robotic mower having a control unit and at least one sensor, a boundary wire, a charging station loop, the charging station and at least one guide wire and wherein the boundary wire makes a loop in the charging station that is narrower than and crosses the charging station loop, the method comprising:
a) receiving a return signal from the control unit that the robotic mower shall return to the charging station,
b) controlling the robotic mower to follow the guide wire at a random distance,
c) detecting the charging station loop by means of the at least one sensor,
d) controlling the robotic mower to move closer to the guide wire,
e) detecting, by means of the at least one sensor, a crossing between the charging station loop and the boundary wire loop, and
f) controlling the robotic mower to follow the boundary wire loop with the at least one sensor until a charging position is reached.

17. The method according to claim 16, wherein the robotic mower is provided with three sensors, the three sensors including two front sensors and one rear sensor and wherein the detection of the boundary wire loop is determined when one of the front sensors passes the charging station loop.

18. The method according to claim 17, wherein both front sensors are used to control the robotic mower, such that the robotic mower follows the boundary wire loop to the charging position.

19. A system for docking a robotic mower with a charging station, comprising the robotic mower, a boundary wire, at least one guide wire, a charging station loop and the charging station and wherein the boundary wire makes a loop in the charging station that is narrower than and crosses the charging station loop, the robotic mower further comprising a control unit and at least one sensor, wherein the control unit comprises a processor and a memory, the memory comprising instructions which when executed by the processor causes the system to:
  a) receive a return signal from the control unit that the robotic mower shall return to the charging station,
  b) control the robotic mower to follow the guide wire at a random distance,
  c) detect the charging station loop by means of the at least one sensor,
  d) control the robotic mower to move closer to the guide wire,
  e) detect, by means of the at least one sensor, a crossing between the charging station loop and the boundary wire loop, and
  f) control the robotic mower to follow the boundary wire loop with the at least one sensor until a charging position is reached.

20. The system according to claim 19, wherein the robotic mower is provided with three sensors, the three sensors including two front sensors and one rear sensor and wherein the system is further caused to determine detection of the charging station loop when one of the front sensors passes the charging station loop.

21. The system according to claim 20, which is further caused to use both front sensors to control the robotic mower, such that the robotic mower follows the boundary wire loop to the charging position.

22. A memory storing a computer program comprising computer program code, the computer program code being capable of implementing the method according to claim 1.

* * * * *